(12) United States Patent
Biskeborn et al.

(10) Patent No.: US 9,105,291 B1
(45) Date of Patent: Aug. 11, 2015

(54) TAPE RECORDING HEAD HAVING NON-PARALLEL GAPS AND DISSIMILAR TRANSDUCER PITCHES

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/205,172

(22) Filed: Mar. 11, 2014

(51) Int. Cl.
*G11B 5/58* (2006.01)

(52) U.S. Cl.
CPC .......................................... *G11B 5/58* (2013.01)

(58) Field of Classification Search
None
See application file for complete search history.

(56) References Cited

U.S. PATENT DOCUMENTS

| | | | |
|---|---|---|---|
| 6,222,698 | B1 | 4/2001 | Barndt et al. |
| 6,331,920 | B1 | 12/2001 | Albrecht et al. |
| 6,757,128 | B2 * | 6/2004 | Yip ............................. 360/77.12 |
| 7,206,170 | B2 | 4/2007 | Yip |
| 7,239,465 | B1 * | 7/2007 | Watson et al. .................. 360/55 |
| 7,480,117 | B2 | 1/2009 | Biskeborn et al. |
| 2004/0120070 | A1 * | 6/2004 | Ito ................................... 360/76 |
| 2008/0266709 | A1 * | 10/2008 | Albertini et al. ............... 360/110 |

FOREIGN PATENT DOCUMENTS

JP 2005259198 9/2005

* cited by examiner

*Primary Examiner* — Paul Huber
(74) *Attorney, Agent, or Firm* — Zilka-Kotab, PC

(57) ABSTRACT

An apparatus according to one embodiment includes a first array of transducers having a longitudinal axis defined between outermost transducers thereof, and a second array of transducers having a longitudinal axis defined between outermost transducers thereof. The longitudinal axes of the arrays are not parallel to one another. A method according to another embodiment includes determining an extent of tape dimensional instability. A tilt angle of a first array of transducers is adjusted to perform a readback operation based on the determined extent. The readback operation is performed. The first array of transducers has a longitudinal axis defined between outermost transducers thereof. A second array of transducers has a longitudinal axis defined between outermost transducers thereof. The longitudinal axes of the arrays are not parallel to one another.

19 Claims, 16 Drawing Sheets

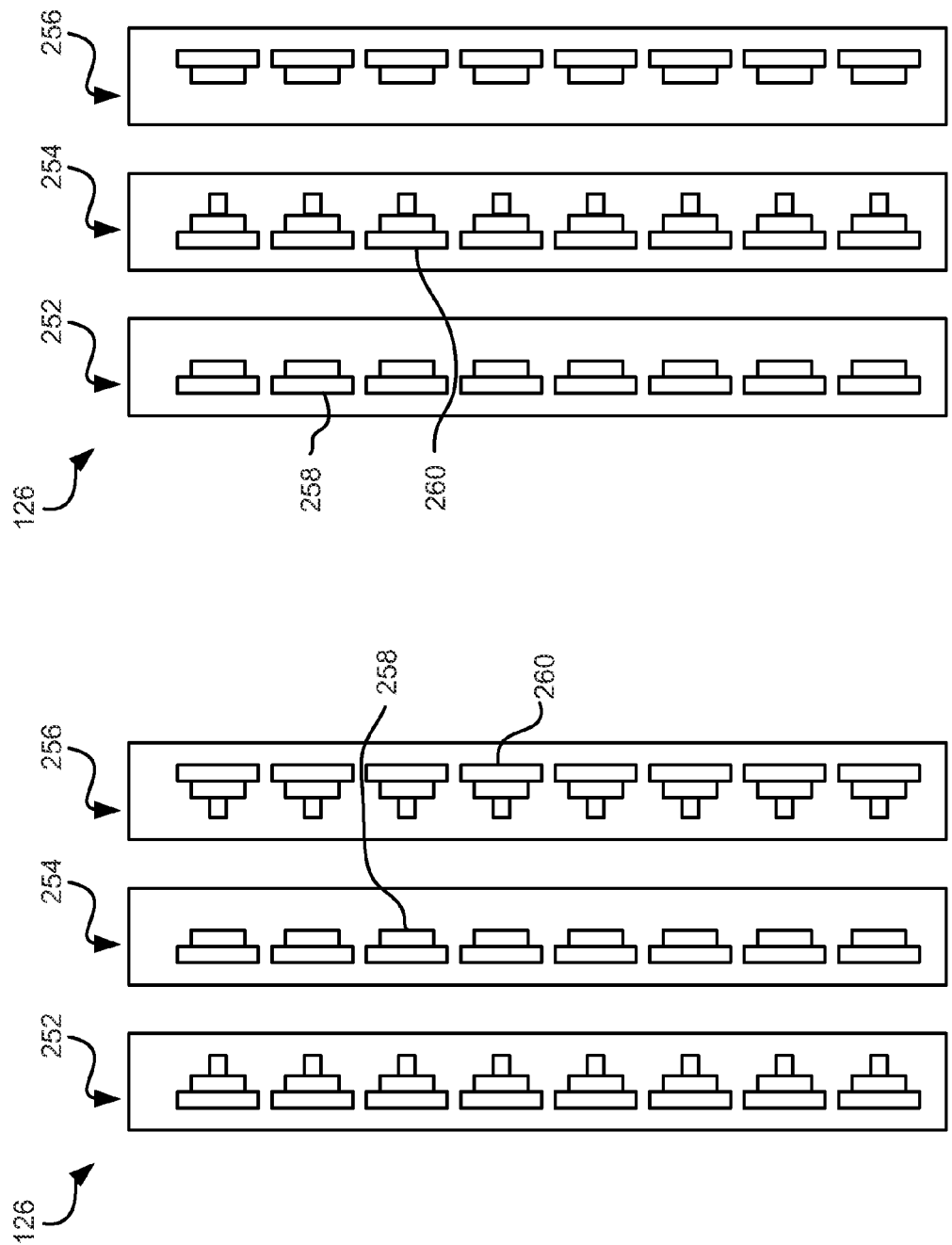

TAPE RECORDING HEAD HAVING NON-PARALLEL GAPS AND DISSIMILAR TRANSDUCER PITCHES

BACKGROUND

The present invention relates to data storage systems, and more particularly, this invention relates to magnetic tape heads having non-parallel arrays of transducers.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., perpendicular to the direction of tape travel) must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, aging, etc. This is often referred to as tape dimensional instability (TDI).

If the tape is written in one environment and then read back in another, TDI may prevent the spacing of the tracks on the tape from precisely matching the spacing of the reading elements during later readback. This may lead to the aforementioned misregistration between some transducers in the array and the data tracks on the tape. Current efforts to cope with these issues include squeezing track pitches in conventionally designed heads and rotating entire head structures. However, such attempts fall short of overcoming the aforementioned problems.

BRIEF SUMMARY

An apparatus according to one embodiment includes a first array of transducers having a longitudinal axis defined between outermost transducers thereof, and a second array of transducers having a longitudinal axis defined between outermost transducers thereof. The longitudinal axes of the arrays are not parallel to one another.

A method according to another embodiment includes determining an extent of tape dimensional instability. A tilt angle of a first array of transducers is adjusted to perform a readback operation based on the determined extent. The readback operation is performed. The first array of transducers has a longitudinal axis defined between outermost transducers thereof. A second array of transducers has a longitudinal axis defined between outermost transducers thereof. The longitudinal axes of the arrays are not parallel to one another.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having non-parallel arrays of transducers, as well as operation and/or component parts thereof. In various embodiments described herein, designs implementing non-parallel arrays of transducers may additionally incorporate dissimilar transducer pitches between the arrays, e.g., such that the transducers remain within the boundaries of the data tracks of a tape after dimensions of the tape change due to TDI.

In one general embodiment, an apparatus includes a first array of transducers having a longitudinal axis defined between outermost transducers thereof, and a second array of transducers having a longitudinal axis defined between outermost transducers thereof. The longitudinal axes of the arrays are not parallel to one another.

In one general embodiment, a method includes determining an extent of tape dimensional instability. A tilt angle of a first array of transducers is adjusted to perform a readback operation based on the determined extent. The readback operation is performed. The first array of transducers has a longitudinal axis defined between outermost transducers thereof. A second array of transducers has a longitudinal axis defined between outermost transducers thereof. The longitudinal axes of the arrays are not parallel to one another.

Figure 1A:
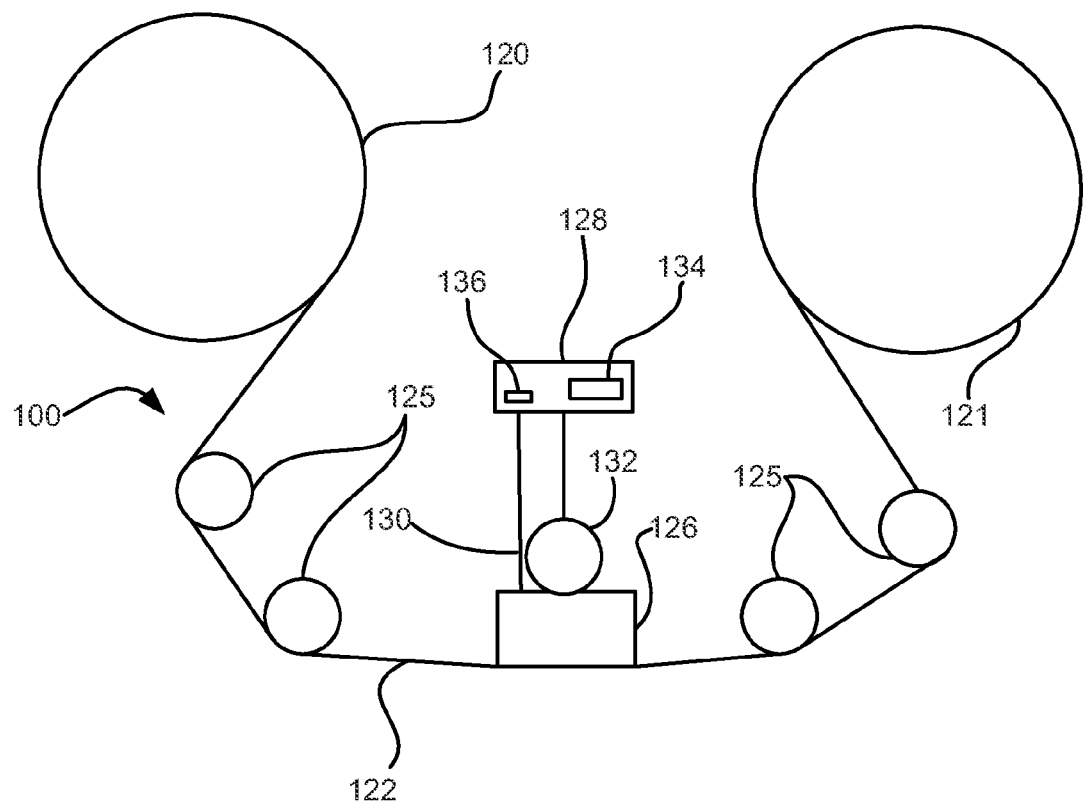
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
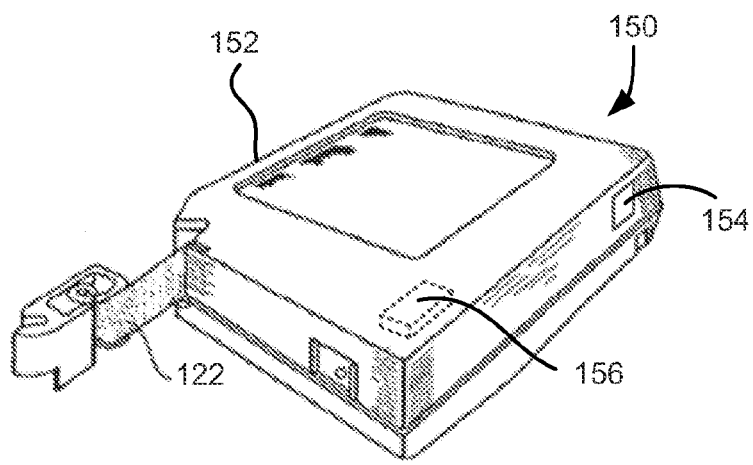
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
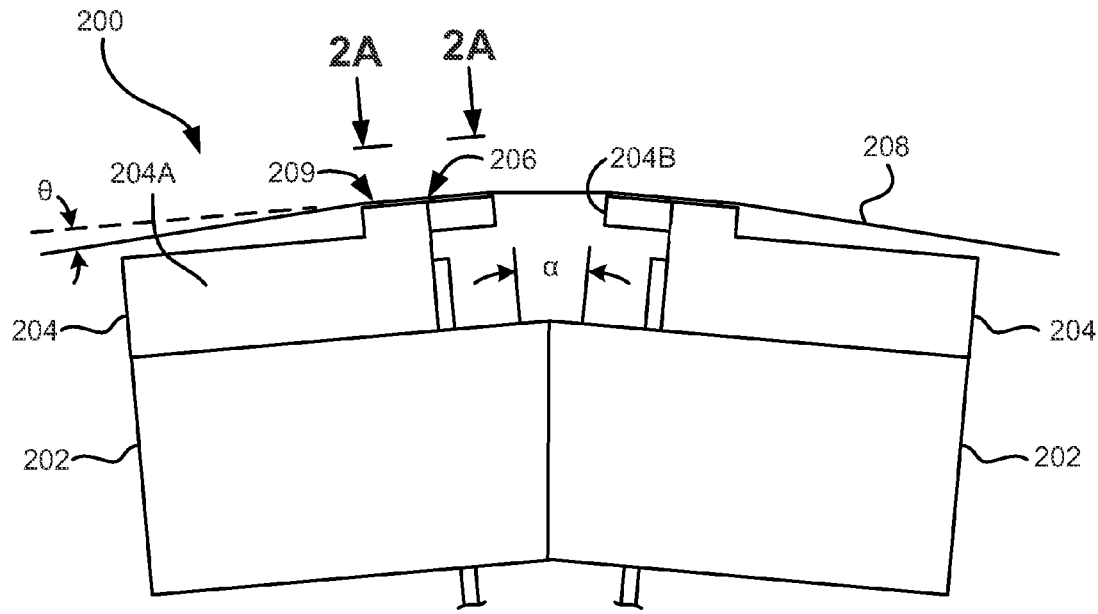
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees. It should be noted that, as used herein, the term "about" with reference to some stated value refers to the stated value±10% of said value.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
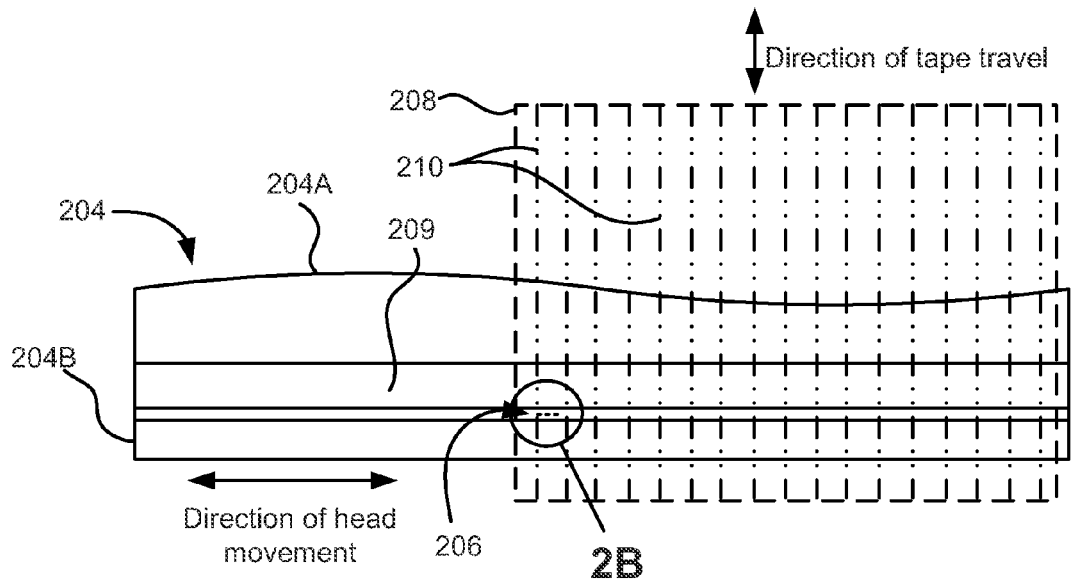
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
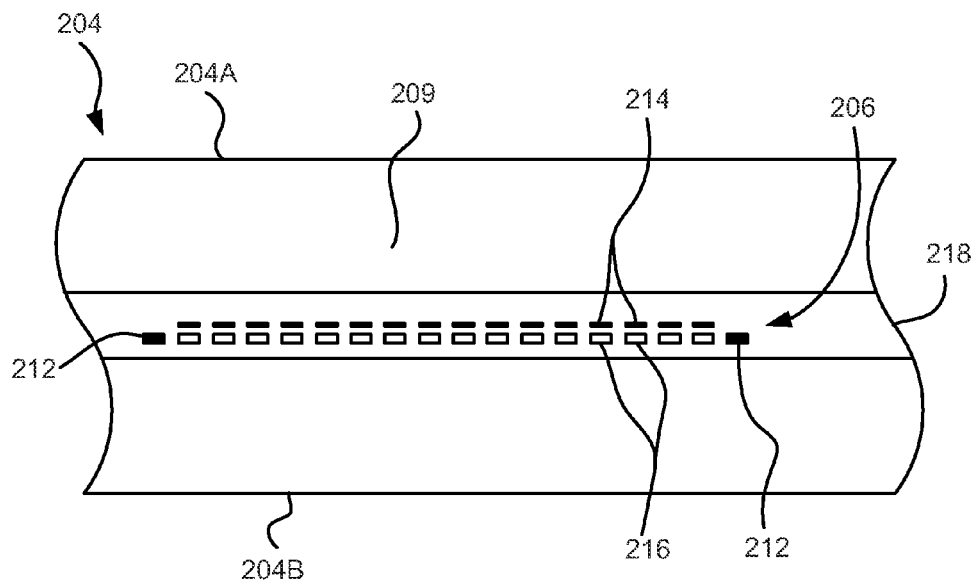
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
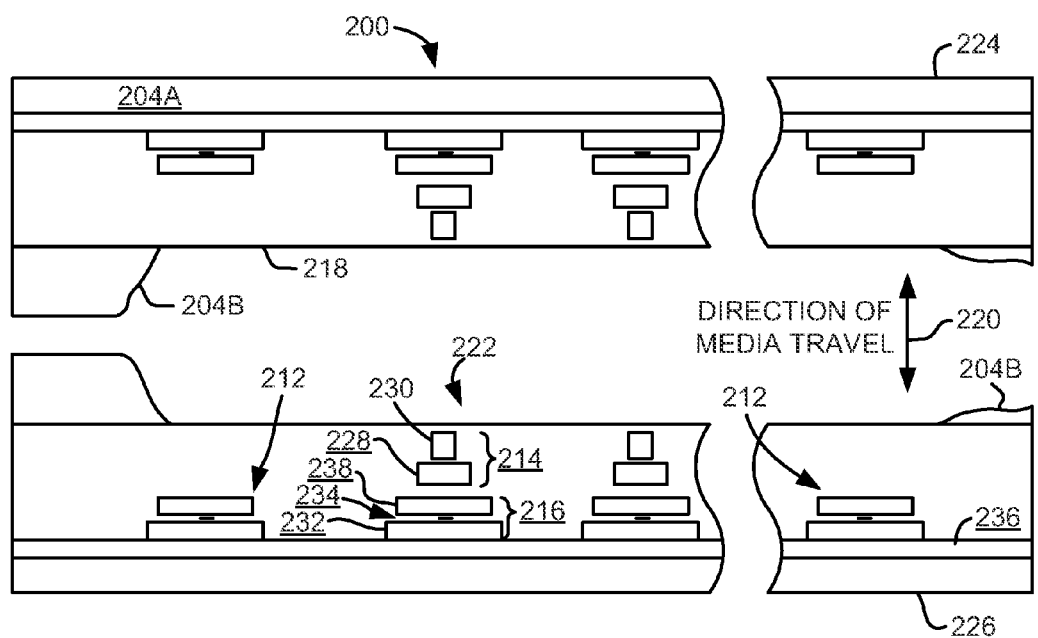
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
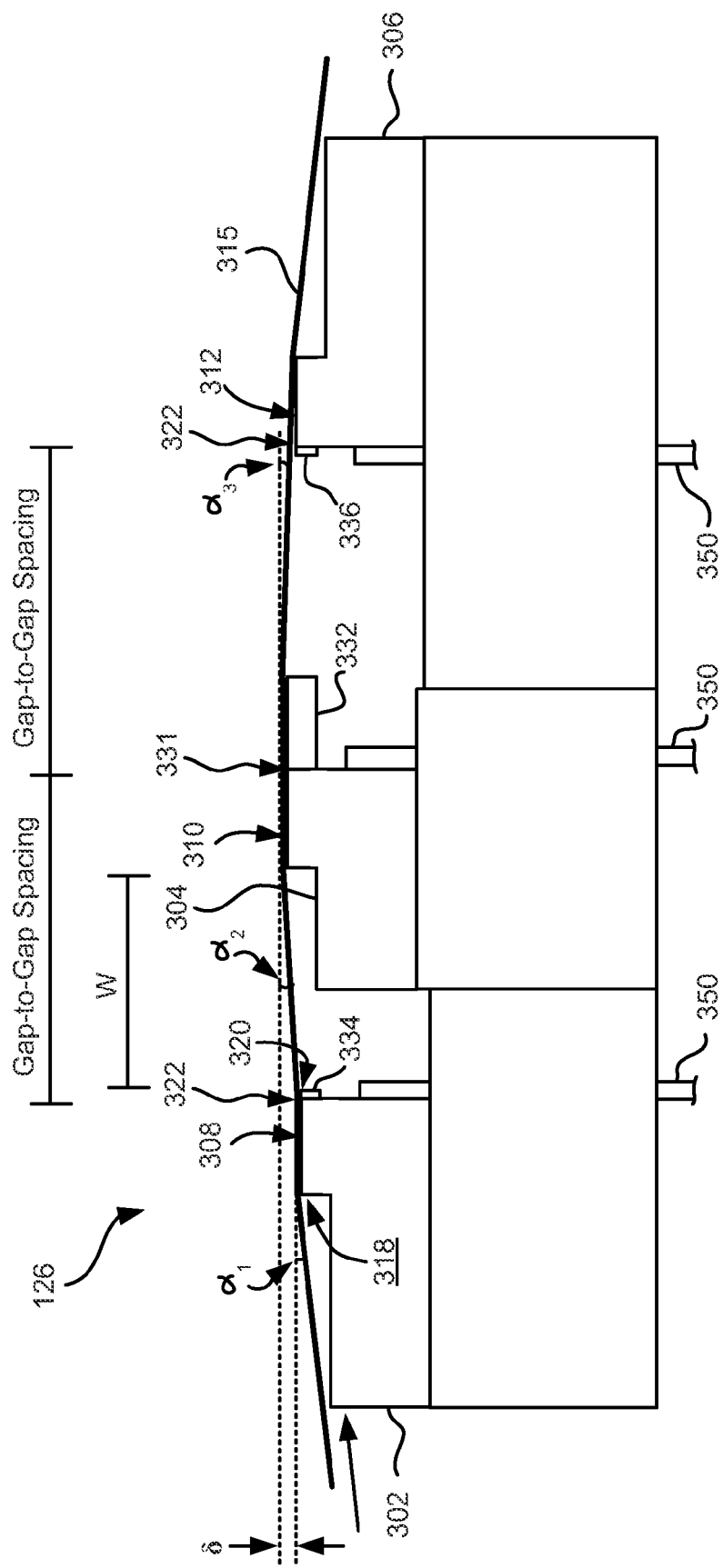
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules.

Also note that the outer modules 302, 306 will alternate as leading modules, depending on the direction of travel of the tape 315.

Figure 6:
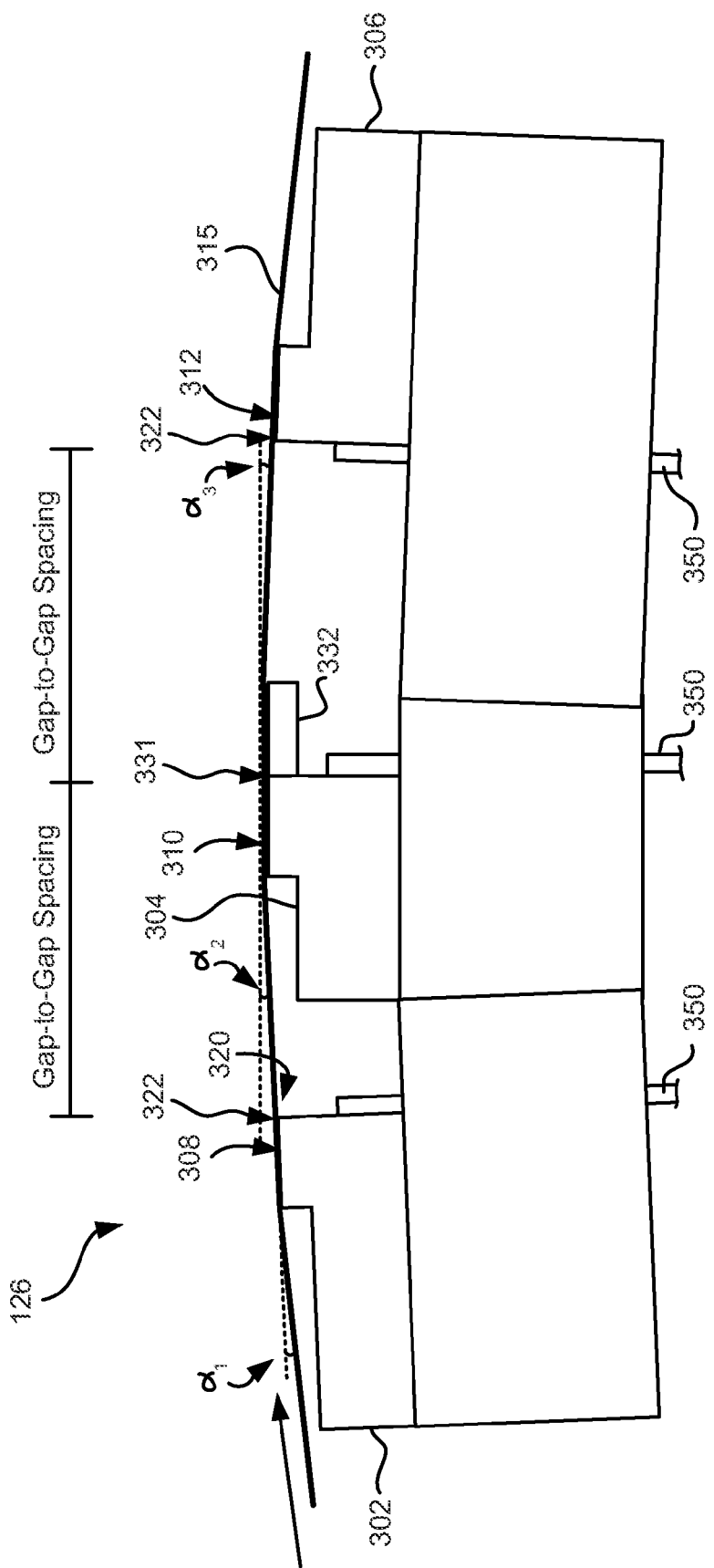
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha3$ on the trailing edge, as the tape 315 rides above the trailing module 306. This difference is generally beneficial as a smaller as tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
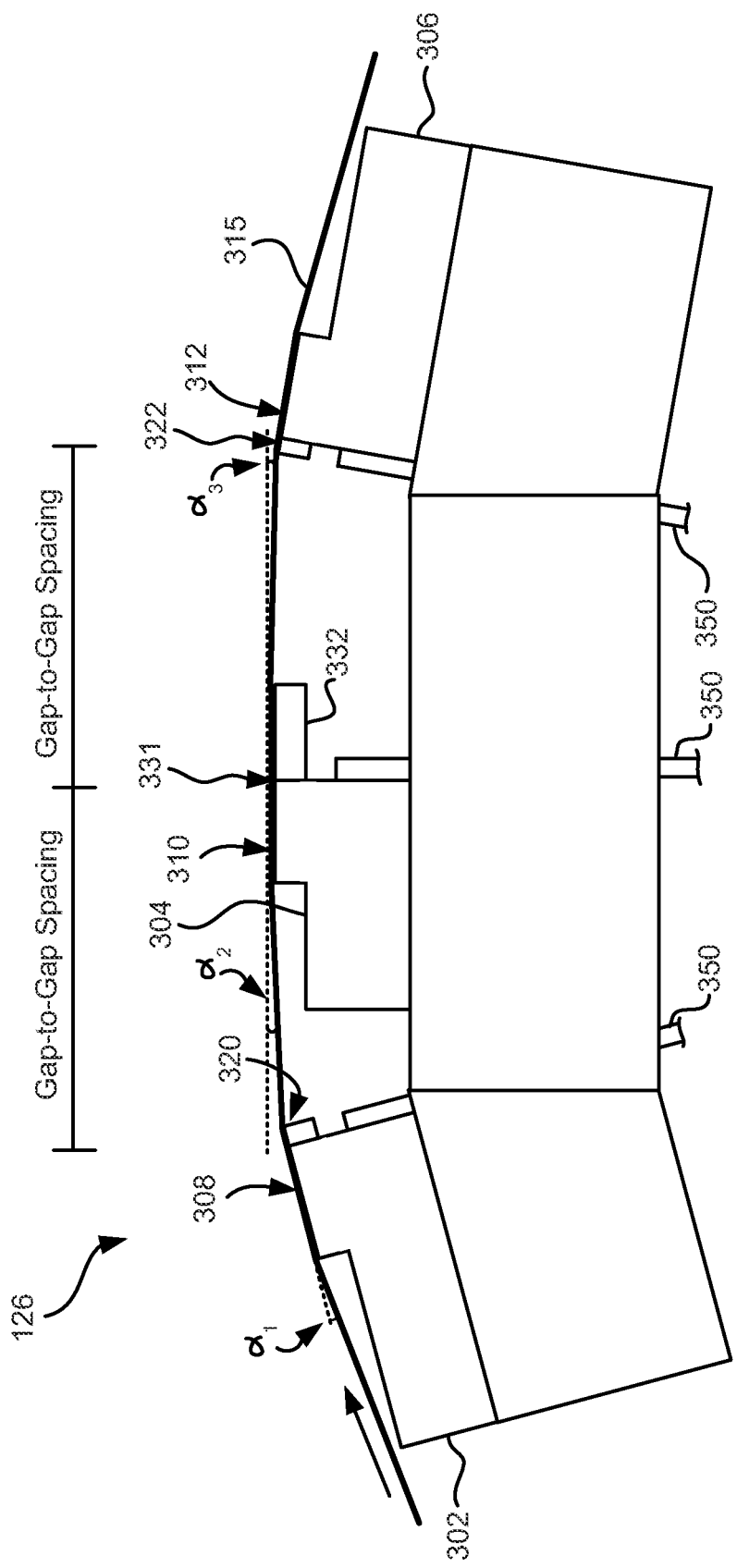
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above and/or herein, conventional u-beam assembly can be used. Accordingly, the mass of the resultant head may be maintained or even reduced relative to heads of previous generations. In other embodiments, the modules may be constructed as a unitary body. Those skilled in the art, now armed with the present teachings, will appreciate that other known methods of manufacturing such heads may be adapted for use in constructing such heads.

As noted above, tape lateral expansion and contraction present many challenges to increasing data track density on conventional products. Conventional products have attempted to compensate for tape lateral expansion and contraction by controlling tape width using tension and improving the characteristics of the media itself. However, these methods fail to fully cancel the tape lateral expansion and contraction, and actually lead to other problems, including tape stretch and media cost increases, respectively.

Figure 8A:
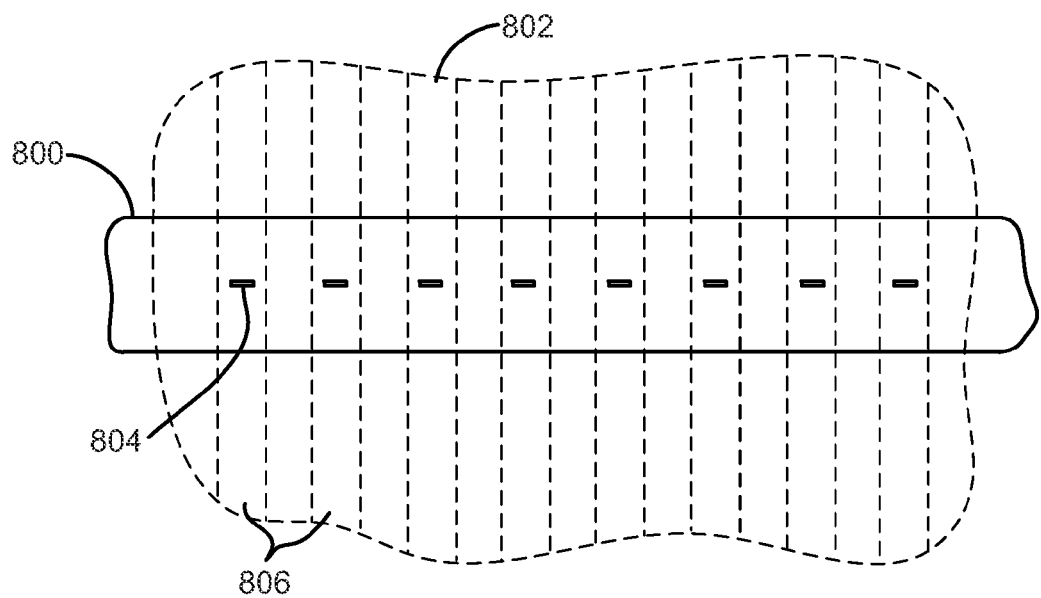
FIGS. 8A-8C are partial top-down views of one module of a magnetic tape head according to one embodiment.
Figure 8B:
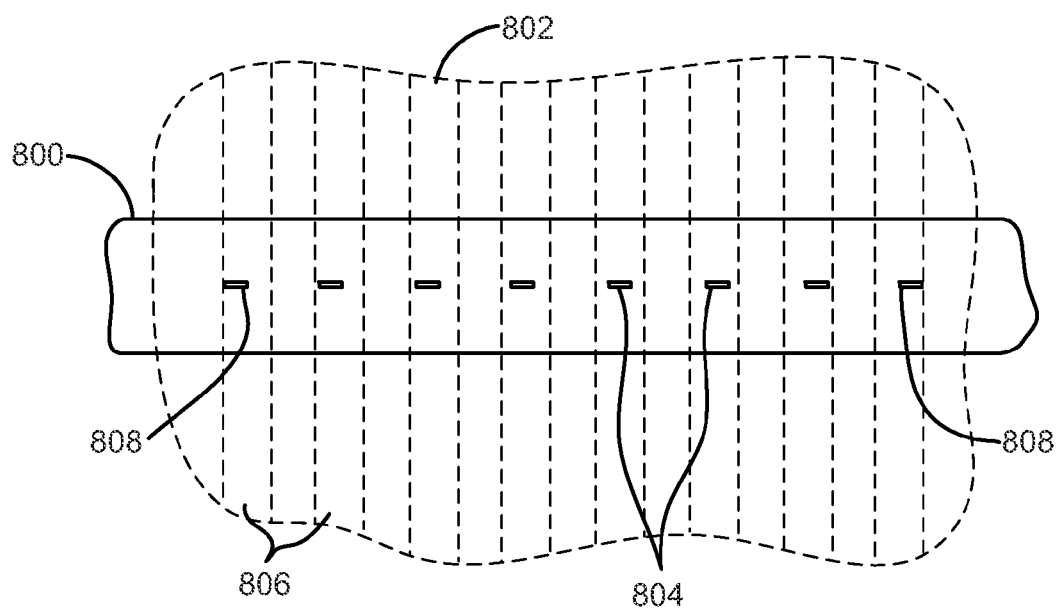
Figure 8C:
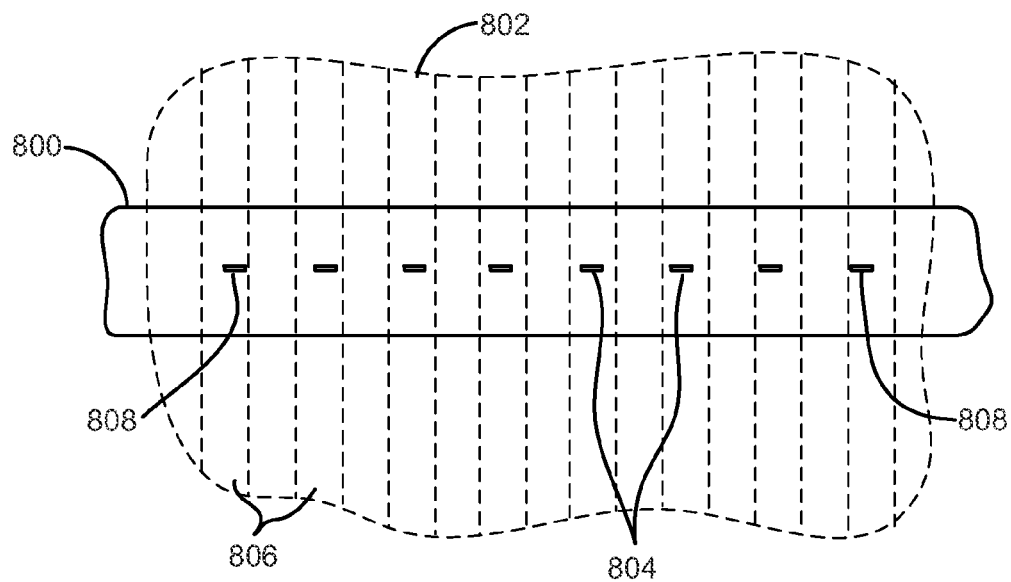

FIGS. 8A-8C are intended to depict the effect of tape lateral expansion and contraction on transducer arrays position relative thereto, and are in no way intended to limit the invention. FIG. 8A depicts a module 800 relative to a tape 802, where the tape 802 has a nominal width. As shown, the transducers 804 are favorably aligned with the data tracks 806 on the tape 802 as each of the transducers 804 are positioned at about the center of a corresponding one of the data tracks 806.

However, FIG. 8B illustrates the effect of tape lateral contraction. As shown, contraction of the tape causes the data tracks to contract as well in the cross-track direction, and the outermost transducers 808 are positioned along the outer edges of the outer data tracks as a result. Moreover, FIG. 8C depicts the effect of tape lateral expansion. Here expansion of the tape causes the data tracks to move farther apart in the cross-track direction, and the outermost transducers 808 are positioned along the inner edges of the outer data tracks as a result.

It follows that if the tape lateral contraction were greater than that shown in FIG. 8B, or the tape lateral expansion were greater than that shown in FIG. 8C, the outermost transducers 808 would cross onto adjacent tracks, thereby causing the adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Thus, it would be desirable to develop a tape drive system able to read and/or write tracks onto the tape in the proper position, regardless of the extent of tape lateral expansion and/or contraction at any given time. Various embodiments described and/or suggested herein overcome the foregoing challenges of conventional products, by orienting at least two modules of a tape drive system, such as by rotating, pivoting and/or tilting, thereby selectively altering the pitch of the transducers in their arrays, as will soon become apparent.

By selectively orienting a module, the pitch of the transducers on the module is thereby altered, preferably aligning the transducers with the tracks on a tape for a given tape lateral expansion and/or contraction. Tape contraction (shrinkage) can be dealt with by orienting (e.g., tilting) a nominally non-offset head, but tape expansion (dilation) cannot. Thus, to accommodate both shrinkage and dilation about a "nominal," the head must be statically positioned at a nominal angle of at least approximately 0.20 as will be explained below. Thereafter, smaller angular adjustments (e.g., about 10 or lower, but could be more) may be made to the already-oriented module in order to compensate for any variation of the tape lateral expansion and/or contraction, thereby desirably keeping the transducers about aligned with the center of the tracks on the tape.

Figure 9A:
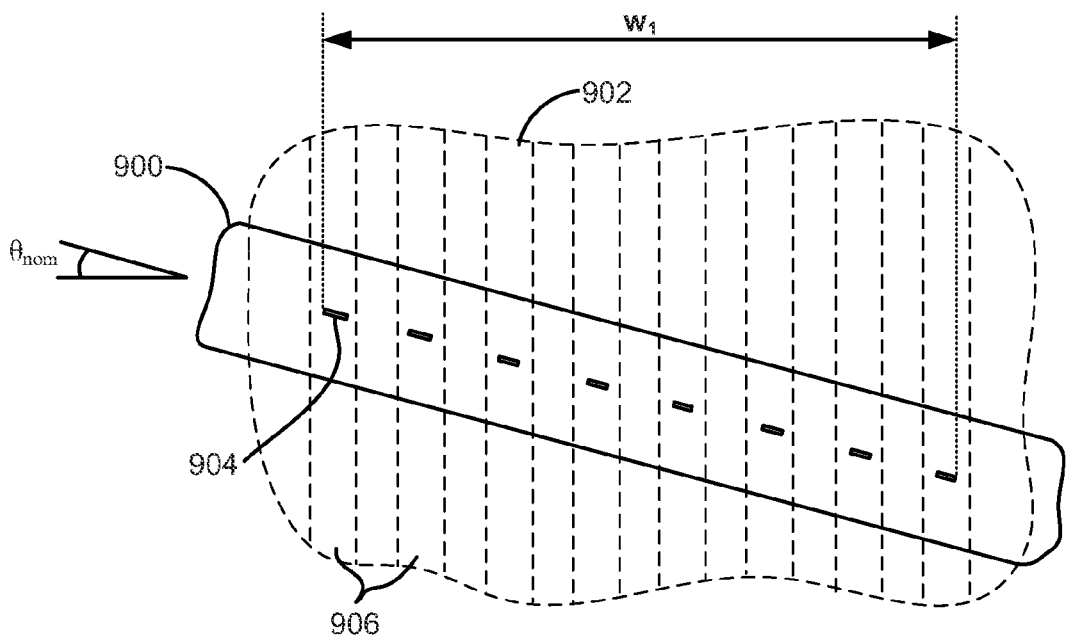
FIGS. 9A-9C are partial top-down views of one module of a magnetic tape head according to one embodiment.
Figure 9B:
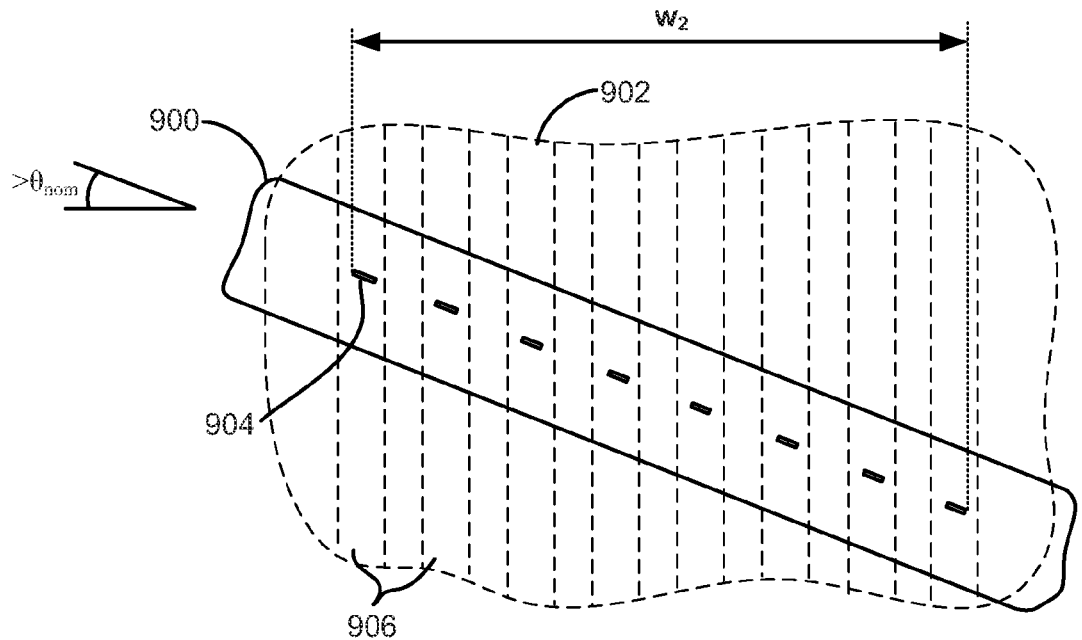
Figure 9C:
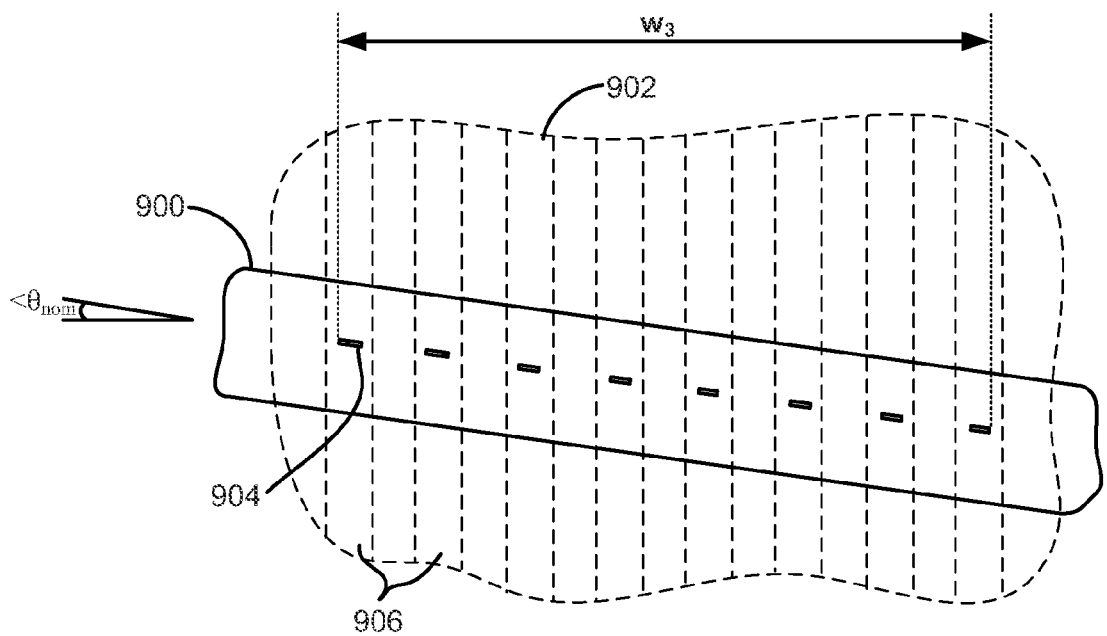

FIGS. 9A-9C illustrate representational views of the effects of orienting a module having transducer arrays. It should be noted that the angles of orientation illustrated in FIGS. 9A-9C are an exaggeration (e.g., larger than would typically be observed), and are in no way intended to limit the invention.

Referring to FIG. 9A, the module 900 is shown relative to the tape 902, where the tape has a nominal width. As illustrated, the module 900 is oriented at an angle $\theta_{nom}$ such that the transducers 904 are favorably aligned with the data tracks 906 on the tape 902. However, when the tape 902 experiences tape lateral contraction and/or expansion, the data tracks 906 on the tape contract and/or expand as well as described above. Moreover, this causes the transducers on the module to no longer be favorably aligned with the data tracks 906 on the tape 902.

In FIG. 9B, the tape 902 has experienced tape lateral contraction. Therefore, in a manner exemplified by FIG. 8B, the transducers 904 on the module 900 of FIG. 9B would no longer be favorably aligned with the data tracks 906 on the tape 902 if no adjustment were made. However, as alluded to above, smaller angular adjustments may be made to the already-oriented module 900 in order to compensate for tape lateral contraction. Therefore, referring again to FIG. 9B, the angle of orientation $>\theta_{nom}$ of the module 900 is further positioned at an angle greater than $\theta_{nom}$. By increasing the angle $>\theta_{nom}$ the effective width $w_2$ of the array of transducers decreases from the effective width $w_1$ illustrated in FIG. 9A. This also translates to a reduction in the effective pitch between the transducers, thereby realigning the transducers 904 along the contracted data tracks 906 on the tape 902 as shown in FIG. 9B.

On the other hand, when the tape experiences tape lateral expansion, the data tracks on the tape expand as well. As a result, the transducers on the module would no longer be favorably aligned with the data tracks on the tape if no adjustments were made. With reference to FIG. 9C, the tape 902 has experienced tape lateral expansion. As previously mentioned, further angular adjustments may be made to the angle of orientation of the module 900 in order to compensate for the tape lateral expansion. Therefore, referring still to FIG. 9C, the angle of orientation <$\theta_{nom}$ of the module 900 is reduced to an angle less than $\theta_{nom}$. By decreasing the angle of orientation <$\theta_{nom}$ the effective width $w_3$ of the array of transducers 904 increases from the effective width $w_1$ illustrated in FIG. 9A. Moreover, reducing the effective width of the array of transducers 904 also causes the effective pitch between the transducers to be reduced, thereby realigning the transducers 904 along the data tracks 906 on the tape 902.

In a preferred embodiment, magnetic tape systems have two or more modules, each having an array of transducers, typically in a row. Depending on the desired embodiment, the additional rows of transducers may allow the system to read verify during the write process, but is not limited thereto. As mentioned above, the foregoing conventional challenges in dealing with TDI may be overcome, e.g., by rotating a given module about an axis orthogonal to the plane in which its array resides (e.g., a plane parallel to the plane of the tape bearing surface), thereby selectively altering the pitch of the transducers in the array as presented to the tape.

By providing a system that compensates for tape lateral expansion and/or contraction, various embodiments enable use of wider readers, resulting in an improved signal to noise ratio (SNR) and/or smaller data tracks, thereby achieving a higher capacity per unit area of the media.

As mentioned above, various embodiments described herein include non-parallel arrays of transducers. Additionally, the arrays of transducers may also include different dissimilar trackwidths and/or center to center pitches, which desirably enable a higher achievable areal density, in addition to backward compatibility, as will soon become apparent.

Figure 10:
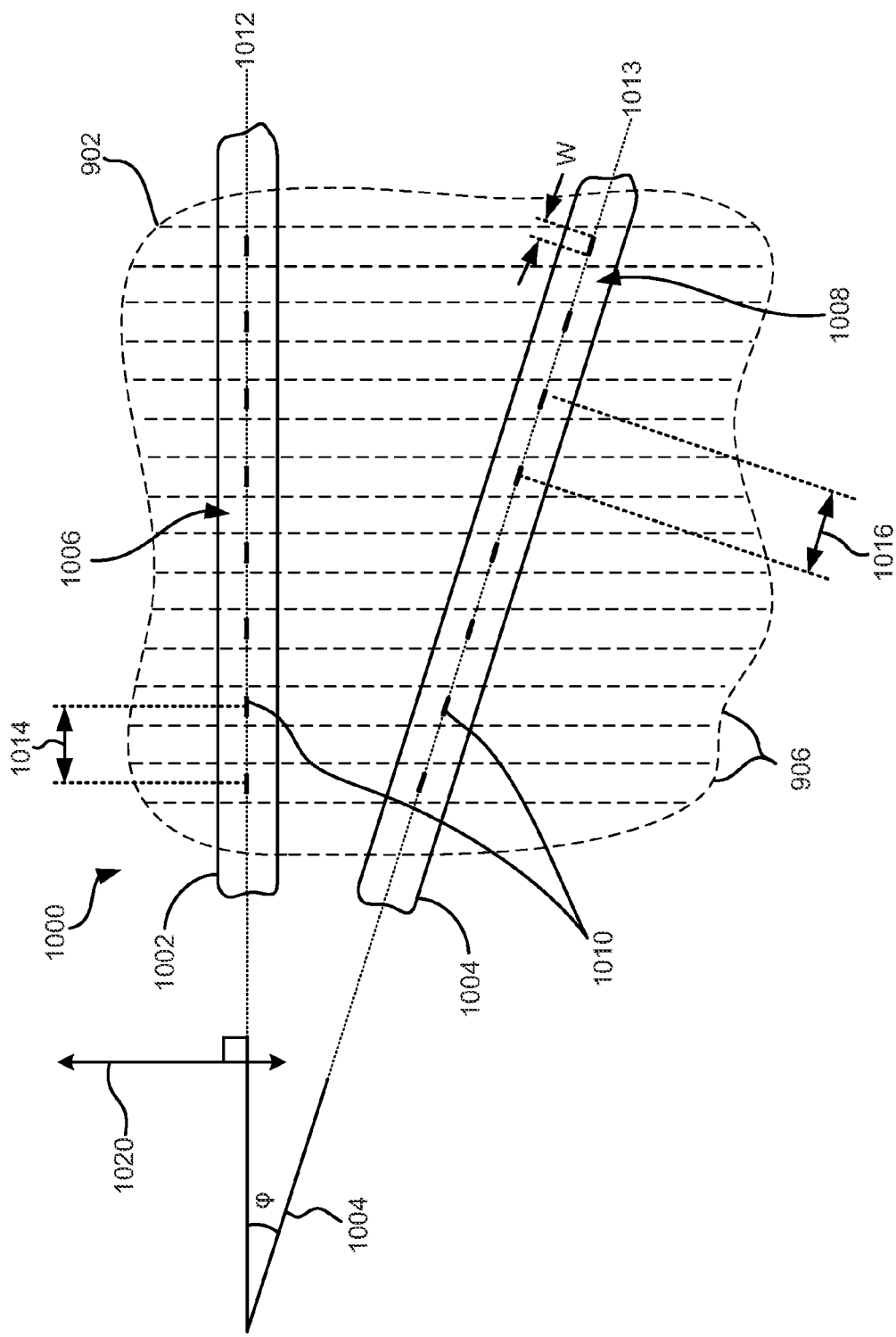
FIG. 10 is a partial top-down view of two modules of a magnetic tape head according to one embodiment.

FIG. 10 depicts an apparatus 1000, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment. Thus FIG. 10 (and the other FIGS.) should be deemed to include any and all possible permutations.

FIG. 10 illustrates a representational view of the effects of orienting a portion of the apparatus having non-parallel transducer arrays. It should be noted that the angle of orientation illustrated in FIG. 10 is an exaggeration (e.g., larger than would typically be observed), and is in no way intended to limit the invention.

Referring still to FIG. 10 the apparatus 1000 includes a first tilted array 1008 of transducers 1010 having a longitudinal axis 1013 defined between outermost transducers 1010 thereof. Additionally, the apparatus 1000 includes a second array 1006 of transducers 1010 having a longitudinal axis 1012 defined between outermost transducers 1010 thereof. The first and second arrays 1008, 1006 of transducers are positioned on modules 1004, 1002 respectively, which may include any of the embodiments described herein.

As referred to in the present description, "transducers" generally refers to data transducers, as opposed to servo transducers. Thus, according to various embodiments, the transducers 1010 may include readers, writers, piggy-backed pairs, merged pairs, etc. However, in other embodiments, servo transducers may be included in one or more of the arrays 1008, 1006, depending on the desired embodiment (e.g., see 212 of FIG. 2C).

The transducers 1010 of the first array 1008 are preferably dissimilar to the transducers 1010 in the second array 1006 in some physical aspect. According to the present description, "dissimilar" may refer to transducer widths, pitches, types, etc. By incorporating arrays 1008, 1006 having dissimilar transducers, the arrays 1008, 1006 may be able to read and/or write to an exemplary tape, despite TDI. According to a preferred embodiment, the transducers 1010 of the tilted first array 1008 may include data readers, while the transducers 1010 of the second array 1006 include data writers, e.g., thereby enabling read while write functionality.

Write operations may be performed in relatively short periods of time, thereby usually minimizing the effects of TDI on the writing process. However, readback operations may occur long after the initial write operation was performed. Thus, according to an example, which is in no way intended to limit the invention, when reading data written to a tape, the tape conditions may be drastically different than when the data was initially written to the tape. In such instances, the tilted first array 1008 is preferably able to compensate for such TDI and read the data previously written to the tape, despite the different tape conditions, e.g., as described in part above with reference to FIGS. 8A-9C, and explained in further detail below in method 1100.

Moreover, write operations may be designed to overcome such readback issues as well. In one embodiment, a write operation may write to a tape such that an entire data band on the tape is not completely written, or completely overwritten. Another exemplary embodiment may include writing to a tape such that an entire data band is completely written, or completely overwritten. Further still, a write operation may shingle write such that the residual shingled track width is equal to or greater than the actual reader width of the transducers in a tilted array, e.g., see 1008 of FIG. 10. As mentioned above, a future readback operation of such data written to the tape may adjust the orientation of the tilted array of transducers to achieve optimal orientation thereof within the data tracks of the tape.

Although the apparatus 1000 of FIG. 10 illustrates two arrays 1008, 1006 of transducers 1010, according to other embodiments, an apparatus may include a third array of transducers, a fourth array of transducers, multiple arrays of transducers, etc., e.g., see FIGS. 12A-12G. According to various embodiments, additional arrays of transducers may be included for added functionality, as will be described in detail below.

With continued reference to FIG. 10, the longitudinal axes 1012, 1013 of the arrays 1008, 1006 are not parallel to one another, thereby forming a relative angle φ therebetween. However, it should be noted that in other embodiments having three or more arrays of transducers 1010, e.g., as depicted in FIGS. 12A-12G, two or more of the at least three arrays of transducers may be oriented about parallel to one another.

Orientations of the longitudinal axes 1012, 1013 of the arrays 1006, 1008 in FIG. 10 are preferably fixed relative to each other. In view of the present description, "fixed" is intended to mean constrained from a directional movement relative to each other, such that the axes 1012, 1013 of the arrays 1006, 1008 maintain a fixed position relative to each other. In other words, the relative angle φ between the longitudinal axes 1012, 1013 cannot change, e.g., even if the arrays 1006, 1008 are selectively oriented (e.g., tilted and/or rotated) as a single structure about a pivot point.

According to various embodiments, the arrays 1006, 1008 may be fixed relative to each other by using rods, fasteners, adhesives, cables, wire, etc. Moreover, the arrays 1006, 1008 are preferably fixed relative to each other prior to being installed in the apparatus 1000, head, etc., depending on the desired embodiment.

As mentioned above, the first array 1008 is tilted with respect to the second array 1006, such that the longitudinal axis 1013 of the first array 1008 is oriented at an angle ϕ relative to the longitudinal axis 1012 of the second array 1006.

According to some embodiments, the angle ϕ between the longitudinal axes of the arrays 1006, 1008 may be adjustable, e.g., using an actuator, etc.

As illustrated in FIG. 10, the second array 1006 of transducers 1010 is preferably oriented substantially orthogonal to the intended direction of tape travel 1020 thereacross. When oriented orthogonal to the direction of tape travel, the second array 1006 of transducers 1010 may be able to detect and determine the skew of the tape during writing thereto, e.g., during a writing process. Moreover, once the skew of the tape is determined, e.g., at least in part by the second array 1006, the determined extent of skew may be used to reposition the first and second arrays 1008, 1006 of transducers 1010, e.g., for skew following.

Despite selective tilting of the first array 1008 e.g., during readback, the second array 1006 preferably remains oriented orthogonal to the tape travel direction 1020 during writing operations. Thus, even if the second array 1006 is tilted from being positioned about orthogonal to the intended direction of tape travel 1020 thereacross during reading, the second array 1006 is preferably returned to orthogonal to the tape travel direction 1020 prior to performing a writing operation.

According to some embodiments, the relative angle ϕ between the longitudinal axes 1012, 1013 may be greater than about 0.1 degree, preferably greater than about 0.2 degrees, but could be higher or lower depending on the preferred embodiment. An illustrative range for the relative angle ϕ may be between about 0.1 degree and about 10 degrees.

As described above with reference to FIGS. 9A-9C, as the axis of an array of transducers is tilted from a position orthogonal to the intended direction of tape, the effective pitch of the transducers as presented to the tape is altered. It follows that, according to one example, if two arrays of transducers having the same center-to-center pitch were positioned such that a second of the arrays is positioned at an angle relative to a first of the arrays (e.g., see ϕ of FIG. 10), each of the arrays of transducers would not align with each other.

Therefore, the center-to-center pitch of the transducers for one array may be higher or lower than the center-to-center pitch of the transducers for the other array to compensate for a change in pitch of the transducers as presented to the tape when tilted. As a result, an apparatus is preferably able to maintain alignment of transducers between multiple arrays along the data tracks of a tape being written to and/or read from. It follows that any such adjustments made to the center-to-center pitch of the transducers are preferably completed before fabrication of the arrays of transducers. Moreover, it should be noted that, although center-to-center pitches are used in the FIGS. and/or descriptions herein, actual and/or average pitches may be used to accomplish similar and/or the same results.

Thus, referring still to FIG. 10, the transducers 1010 of the first array 1008 preferably include a center-to-center pitch 1016 that is greater than a center-to-center pitch 1014 of the transducers of the second array 1006. As a result, the transducers 1010 of the first and second array 1008, 1006 may remain about aligned along the data tracks 906 in the intended direction of tape travel 1020.

The width W of each of the transducers extends along the longitudinal axis thereof, as illustrated. According to preferred embodiments, the average width of the transducers 1010 of the first array 1008 may be smaller than an average width of the transducers 1010 of the second array 1006, e.g., to assist in maintaining the transducers 1010 over the proper data tracks 906 on a tape 902 suffering from TDI. However, in other embodiment, the average width of the transducers 1010 of the first array 1008 may be about the same as an average width of the transducers 1010 of the second array 1006.

Furthermore, when the transducers of the second array 1006 are writers and the first array 1008 transducers are readers, it is preferable in some embodiments that the projected reader width is less than the writer width for proper read verification while writing.

Figure 11:
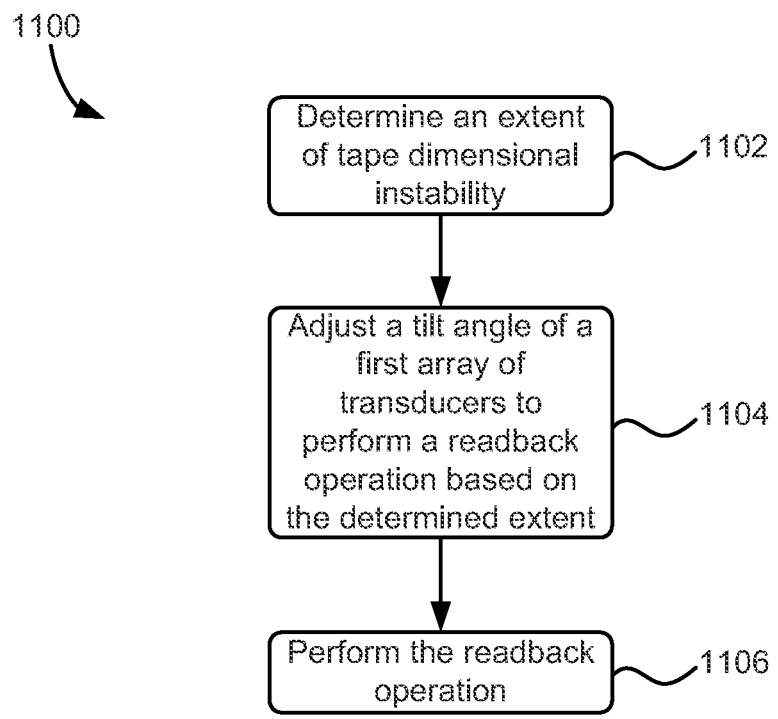
FIG. 11 is a flowchart of a method according to one embodiment.

FIG. 11 depicts a method 1100 for orienting modules having transducers, in accordance with one embodiment. Such method 1100 may be implemented by the controller of FIG. 1A. As an option, the present method 1100 may be implemented in conjunction with features from any other embodiment listed herein, such as those described with reference to the other FIGS, such as FIG. 10. Of course, however, such method 1100 and others presented herein may be used in various applications and/or in permutations which may or may not be specifically described in the illustrative embodiments listed herein. Further, the method 1100 presented herein may be used in any desired environment.

Method 1100 of FIG. 11 includes determining an extent of tape dimensional instability as illustrated in operation 1102. Any known method of making such a determination may be used. As mentioned above, readback operations may occur long after the initial write operation was performed, and tape conditions may be drastically different than when the data was initially written to the tape. Thus, an array of transducers having a canted orientation relative to an intended direction of tape travel may be utilized to overcome such a change in tape conditions.

The method 1100 of FIG. 11 further includes adjusting a tilt angle of a first array of transducers to perform a readback operation based on the determined extent. See operation 1104. Furthermore, operation 1106 includes performing the readback operation.

As mentioned above, the method 1100 may be implemented with any of the embodiments described and/or suggested herein. Thus, with continued reference to the method 1100, the first array of transducers as described in operation 1104 may include any of the embodiments above, with respect to the first and second arrays 1008, 1006 of transducers 1010 (FIG. 10).

Moreover, in other embodiments, one or more of the operations of the method 1100 illustrated in FIG. 11 may be performed in part and/or in full by a controller, e.g., see 128 of FIG. 1A. However in other embodiments, the method 1100 may be performed using a computing device, a user interface, etc. or any other device capable of performing the operations thereof.

As mentioned above, for embodiments having two non-parallel arrays of transducers, during normal operation, the two arrays may perform bidirectional read and/or write operations although they are not oriented parallel to each other. In other words, both of the non-parallel arrays of transducers may be primary to the operation of the apparatus.

However, in other embodiments having three or more arrays of transducers, at least one of the arrays may be designated for performing backward compatible read operations.

FIGS. 12A-12G depict representational views of apparatuses 1200, 1210, 1220, 1230, 1240, 1250 having transducer array orientations in accordance with different embodiments. As an option, the present representation views of apparatuses 1200, 1210, 1220, 1230, 1240, 1250 may be implemented in conjunction with features from any other embodiment listed herein, such as those described with reference to the other FIGS., e.g., FIG. 10. Additionally, any of the embodiments illustrated in FIGS. 12A-12G may be incorporated with any and/or all of the operations of the method 1100 illustrated in FIG. 11.

Of course, however, such representation views of apparatuses 1200, 1210, 1220, 1230, 1240, 1250 and others presented herein may be used in various applications and/or in permutations which may or may not be specifically described in the illustrative embodiments listed herein. Further, the representation views of apparatuses 1200, 1210, 1220, 1230, 1240, 1250 presented herein may be used in any desired environment. Thus FIGS. 12A-12G (and the other FIGS.) should be deemed to include any and all possible permutations. Those skilled in the art, now armed with the present teachings, will appreciate that known methods of manufacturing magnetic heads may be adapted for use in constructing such permutations.

It should also be noted that additional modules included in the apparatuses 1200, 1210, 1220, 1230, 1240, 1250 of FIGS. 12A-12G are intended to illustrate representational views of possible array orientations, according to different embodiments, and are in no way intended to limit the invention. Moreover, the number, pitch, width and/or any other physical characteristics of the transducers depicted in FIGS. 12A-12G are for representational purposes only, and are in no way intended to limit the various embodiments described above.

FIGS. 12A-12G include a first, second and third array 1008, 1006, 1204 having longitudinal axes 1013, 1012, 1206 respectively, defined between outermost transducers 1010 thereof. As described above, the longitudinal axis 1013 of the first array 1008 is oriented at an angle relative to the longitudinal axis 1012 of the second array 1006. Thus, the first and second arrays are not oriented parallel to each other in the apparatuses 1200, 1210, 1220, 1230, 1240, 1250 depicted. Moreover, the embodiments illustrated in FIGS. 12A-12G may include additional arrays of transducers, as will soon become apparent.

Figure 12A:
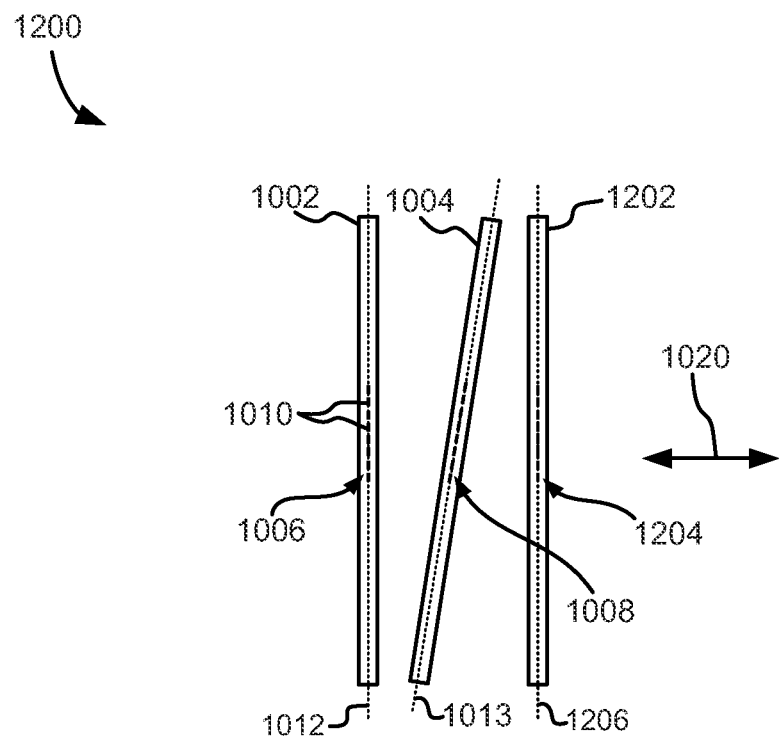
FIG. 12A-12G are representational views of array orientations according to several embodiments.

Referring now to FIG. 12A, the apparatus 1200 includes a third module 1202 having a third array 1204 of transducers 1010, in addition to the first and second arrays 1008, 1006 of transducers 1010 of the first and second modules 1004, 1002 respectively. Moreover, as illustrated, the first array 1008 of transducers is positioned between the second and third arrays 1006, 1204 of transducers.

As shown, the longitudinal axis 1206 of the third array 1204 is oriented parallel (i.e., within tolerances) to the longitudinal axis 1012 of the second array 1006. Moreover, the longitudinal axes 1206, 1012 of the third and second arrays 1204, 1006 are illustrated as being positioned orthogonal to the intended direction of tape travel 1020 thereacross. This desirably aligns each of the transducers of the third array with each of the transducers of the second array in the intended direction of tape travel 1020. The transducers 1010 of the second and third arrays 1006, 1204 are preferably also aligned within data tracks of a tape (e.g., see 906 and 902 of FIG. 10).

According to one example of the present embodiment, the first and second 1008, 1006, and first and third arrays 1008, 1204 may perform read while write operations. Thus the second array 1006 preferably includes writers and the third array 1204 includes writers. However, in various other embodiments, the transducers of the arrays 1008, 1006, 1204 may include any of the transducer types, pitches, widths, etc., as described and/or suggested above with reference to FIG. 10.

As mentioned above, the arrays of transducers of each of the embodiments illustrated in FIGS. 12A-12G may be oriented differently with respect to each other. Thus, referring now to FIG. 12B, the apparatus 1210 illustrates a variation of the embodiment of FIG. 12A, depicting the second array 1006 as being positioned between the first and third tilted arrays 1008, 1204. Preferably, the first and third arrays 1008, 1204 include readers while the second array 1006 includes writers.

According to a preferred embodiment, the longitudinal axis 1206 of the third array 1204 may be oriented parallel (i.e., within tolerances) to the longitudinal axis 1013 of the first array 1008. Moreover, the longitudinal axis 1012 of the second array is preferably positioned substantially orthogonal to the intended direction of tape travel 1020 thereacross. It follows that, according to the present embodiment, the longitudinal axes 1012, 1206 of the second and third arrays 1006, 1204 respectively, are not parallel to one another.

Figure 12B:
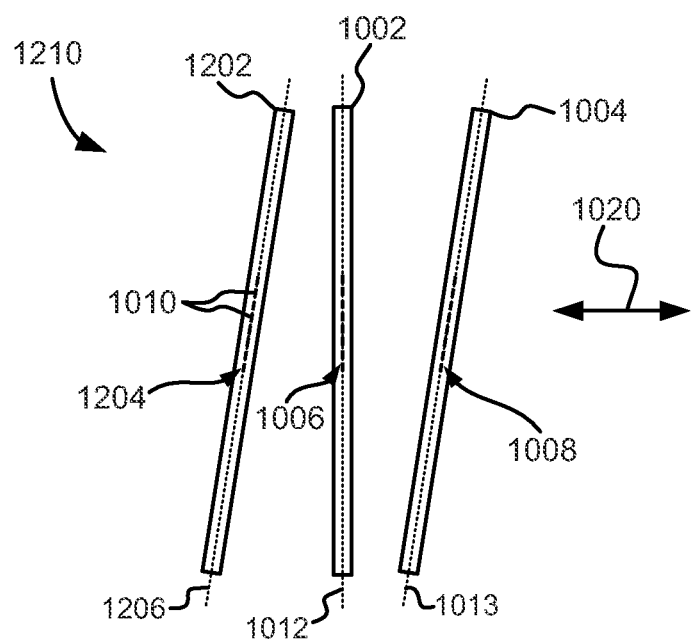

In some embodiments, with continued reference to FIG. 12B, a center-to-center pitch between the transducers 1010 of the third 1204 array may be greater than a center-to-center pitch between the transducers 1010 of the first array 1008. Moreover, the center-to-center pitch between the transducers 1010 of the first and third arrays 1008, 1204 may be about the same.

Figure 12C:
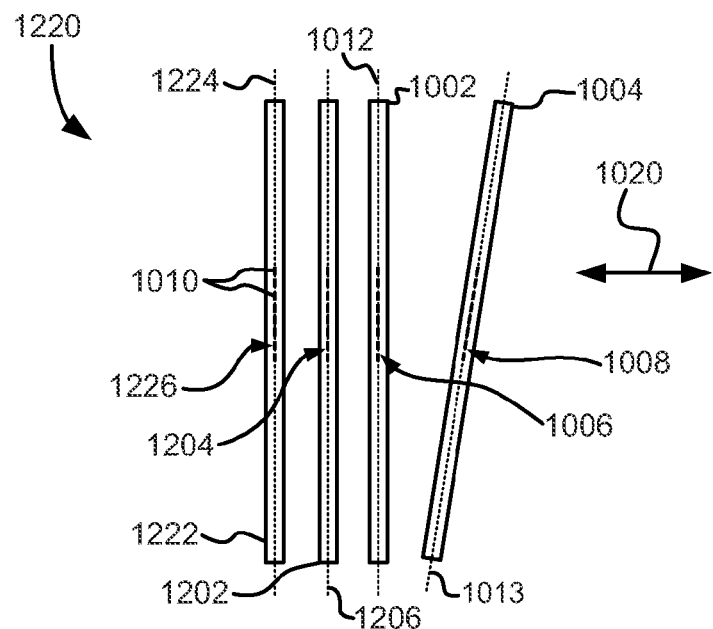

Looking now to FIGS. 12C-12F, a fourth array 1226 of transducers 1010 positioned on module 1222 is incorporated. Referring to FIG. 12C, the fourth array 1226 of transducers 1010 is illustrated as having a longitudinal axis 1224 oriented parallel (i.e., within tolerances) to the longitudinal axes 1206, 1012 of the third and second arrays 1204, 1006. e.g., which are preferably oriented substantially orthogonal to the intended direction of tape travel 1020 thereacross. Thus, according to the present embodiment, the second, third and fourth arrays 1006, 1204, 1226 may be able to perform read while write operations, e.g., by having a Write-Read-Write (WRW) configuration.

Figure 12D:
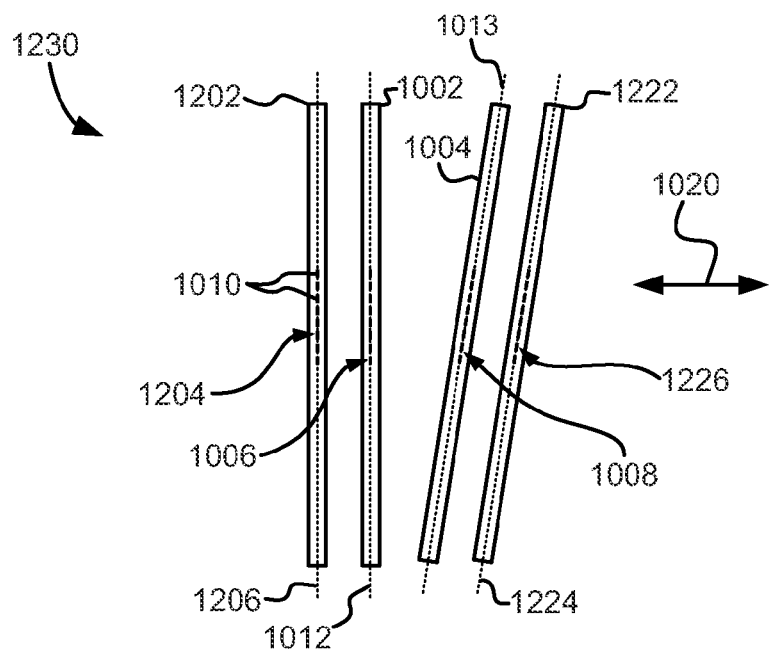

Referring now to FIG. 12D the apparatus 1230 includes yet another array orientation in which the first and second arrays 1008, 1006 of transducers 1010 are oriented between a third and fourth array 1204, 1226 of transducers 1010. As illustrated, the longitudinal axes 1206, 1012 of the second and third modules 1002, 1202 respectively, are oriented parallel to each other, and orthogonal to the intended direction of tape travel 1020 thereacross. Additionally, the longitudinal axes 1013, 1224 of the first and fourth modules 1004, 1222 respectively, are preferably oriented substantially parallel to each other, e.g., at an angle relative to an orientation orthogonal to the intended direction of tape travel 1020 thereacross. It follows that, according to the present embodiment, the longitudinal axes 1012, 1206 of the second and third modules 1002, 1202 are not parallel to the longitudinal axes 1013, 1224 of the first and fourth modules 1004, 1222.

Figure 12E:
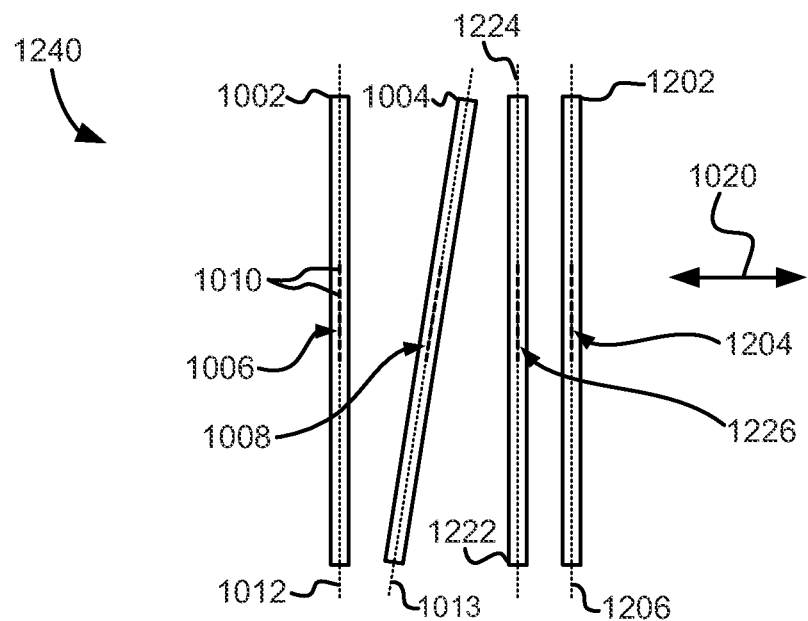

FIG. 12E illustrates an apparatus 1240 in which the second array 1006 of transducers 1010 is illustrated as having a longitudinal axis 1012 oriented parallel (i.e., within tolerances) to the longitudinal axis 1206 of the third array 1204 of transducers 1010. The fourth array 1226 of transducers 1010 is also illustrated as being oriented substantially parallel to the longitudinal axes 1012, 1206 of the second and third arrays 1006, 1204, according to the present embodiment.

Moreover, according to another embodiment, the axes 1012, 1206, 1224 of the second, third and fourth arrays 1006, 1204, 1226 may be oriented substantially orthogonal to the intended direction of tape travel 1020 thereacross, e.g., when in a nominal position.

Figure 12F:
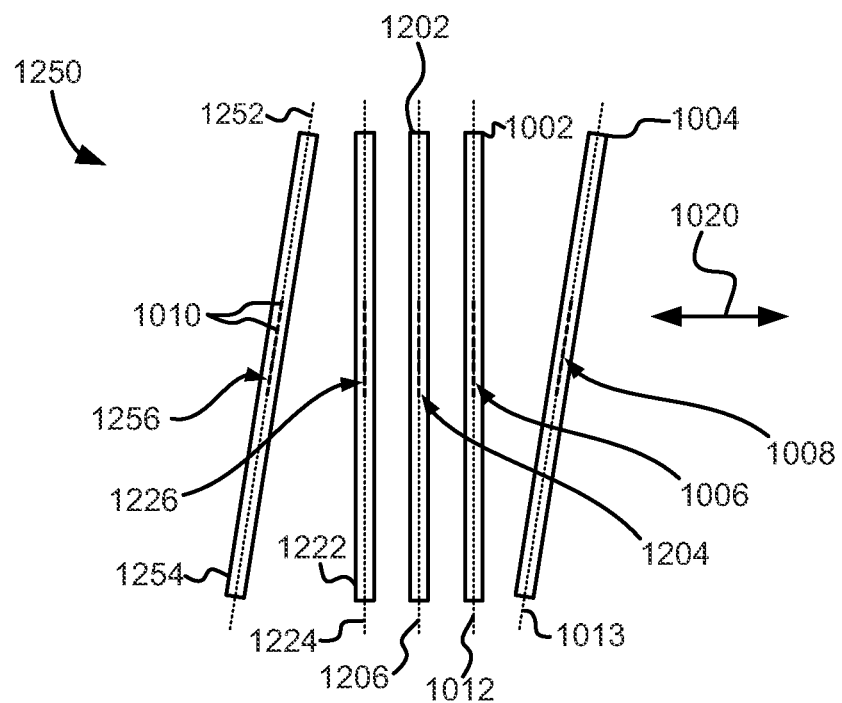

Further still, looking to FIG. 12F, a fifth module 1254 having a fifth array 1256 of transducers 1010 may additionally be incorporated according to some embodiments. FIG. 12F illustrates an apparatus 1250 in which the longitudinal axis 1012 of the second array 1006 is oriented parallel (i.e., within tolerances) to the longitudinal axes 1206, 1224 of the third and fourth arrays 1204, 1226, which are illustrated as being substantially orthogonal to the intended direction of tape travel 1020 thereacross in the present embodiment.

Furthermore, the second, third and fourth arrays 1006, 1204, 1226 are illustrated as being orientated between the first and fifth arrays 1008, 1256. Additionally, longitudinal axes of the second, third and fourth arrays 1006, 1204, 1226 are not parallel to the longitudinal axes 1013, 1252 of the first and fifth arrays 1008, 1256.

Figure 12G:
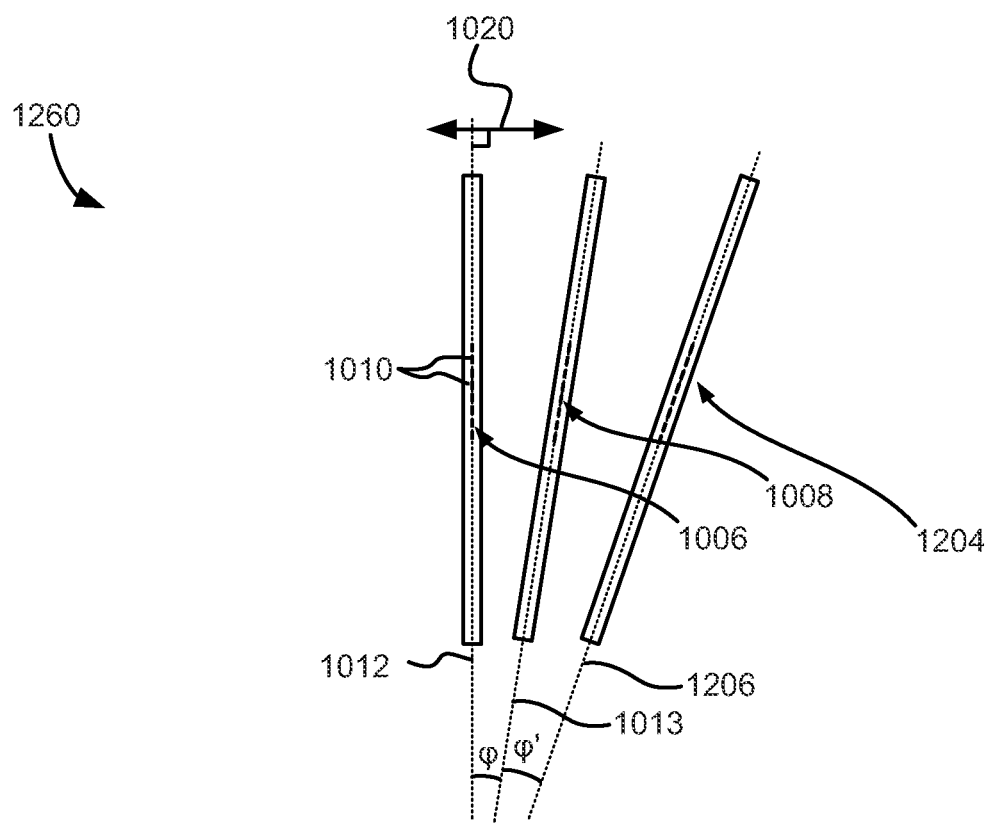

FIG. 12G illustrates yet another embodiment 1260 having an angle $\phi$ between the longitudinal axes 1013, 1012 of the first and second arrays 1008, 1006 and an angle $\phi'$ between the longitudinal axes 1013, 1206 of the second and third arrays 1008, 1204. The angles $\phi$, $\phi'$ may be the same or different. Preferably, a pitch between the transducers 1010 of the third array 1204 is greater than a pitch between the transducers of the first array 1008. As in previously-described embodiments, a pitch between the transducers 1010 of the second array 1008 may be greater than a pitch between the transducers of the first array 1006.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a first array of at least eight transducers having a longitudinal axis defined between outermost transducers thereof; and
a second array of at least eight transducers having a longitudinal axis defined between outermost transducers thereof,
wherein the longitudinal axes of the arrays are not parallel to one another,
wherein an angle between the longitudinal axes of the arrays is adjustable,
wherein the transducers are for reading and/or writing data in data bands of a magnetic medium, and further comprising at least one servo track reader associated with each array for reading servo data from the medium.

2. An apparatus as recited in claim 1, wherein orientations of the longitudinal axes of the arrays are fixed relative to each other, wherein the transducers of at least one of the arrays includes readers, wherein widths of the readers in a direction perpendicular to an intended direction of tape travel thereacross are less than widths of data tracks for which the readers are designed to read.

3. An apparatus as recited in claim 1, wherein a pitch of the transducers of the first array is greater than a pitch of the transducers of the second array.

4. An apparatus as recited in claim 1, wherein a relative angle between the longitudinal axes is greater than 0.1 degree.

5. An apparatus as recited in claim 1, wherein an average width of the transducers of the first array is smaller than an average width of the transducers of the second array.

6. An apparatus as recited in claim 1, wherein the transducers of the first array are dissimilar to the transducers in the second array.

7. An apparatus as recited in claim 1, further comprising a third array of transducers having a longitudinal axis oriented parallel to the longitudinal axis of the second array.

8. An apparatus as recited in claim 7, further comprising a fourth array of transducers having a longitudinal axis oriented parallel to the longitudinal axis of the second array.

9. An apparatus as recited in claim 7, wherein the first array is positioned between the second and third arrays.

10. An apparatus as recited in claim 1, wherein the transducers of the first array include readers.

11. An apparatus as recited in claim 1, further comprising a third array of transducers having a longitudinal axis defined between outermost transducers thereof, wherein the longitudinal axes of the second and third arrays are not parallel to one another.

12. An apparatus as recited in claim 11, wherein the second array is positioned between the first and third arrays.

13. An apparatus as recited in claim 1, further comprising:
a drive mechanism for passing a magnetic medium over the arrays of transducers; and
a controller electrically coupled to the arrays of transducers.

14. An apparatus as recited in claim 13, wherein the controller is configured to:
determine an extent of tape dimensional instability;
select either a first array of transducers or a second array of transducers to perform a readback operation based on the determined extent;
perform the readback operation using the selected array; and
perform writing operations using one of the arrays only when the longitudinal axis of the array is oriented orthogonal to an intended direction of tape travel thereacross.

15. An apparatus, comprising
a first array of at least eight transducers having a longitudinal axis defined between outermost transducers thereof;
a second array of at least eight transducers having a longitudinal axis defined between outermost transducers thereof; and
a third array of transducers having a longitudinal axis defined between outermost transducers thereof, wherein the longitudinal axes of the second and third arrays are not parallel to one another,
wherein the longitudinal axes of the first and second arrays are not parallel to one another,
wherein a pitch between the transducers of the third array is greater than a pitch between the transducers of the first array.

16. A method, comprising:
determining an extent of tape dimensional instability;
adjusting a tilt angle of a first array of transducers to perform a readback operation based on the determined extent; and
performing the readback operation,
wherein the first array of transducers has a longitudinal axis defined between outermost transducers thereof,
wherein a second array of transducers has a longitudinal axis defined between outermost transducers thereof,
wherein the longitudinal axes of the arrays are not parallel to one another.

17. A method as recited in claim 16, wherein orientations of the longitudinal axes of the arrays are fixed relative to each other.

18. A method as recited in claim 16, wherein a pitch of the transducers of the first array is greater than a pitch of the transducers of the second array.

19. A method as recited in claim 16, wherein an average width of the transducers of the first array is smaller than an average width of the transducers of the second array.

* * * * *